United States Patent Office 3,595,692
Patented July 27, 1971

3,595,692
TELEPHONE CABLE HAVING APPLIED THERETO A TACKY SQUIRREL REPELLENT WHOSE ADHESIVE TACK EXCEEDS ITS COHESIVE TACK
Oliver B. Gerrish, Kansas City, Mo., assignor to Southwestern Bell Telephone Company
No Drawing. Filed Apr. 24, 1967, Ser. No. 632,896
Int. Cl. B44d 1/16, 1/42; H01b 3/30
U.S. Cl. 117—218                2 Claims

ABSTRACT OF THE DISCLOSURE

Protection of things from damage by squirrels, and other rodents, by coating the things with a sticky substance which, when stepped on by a squirrel, has insufficient cohesiveness to prevent the squirrel from freeing itself, but nevertheless sticks to the squirrel's tissue after he has freed himself, thereby teaching the squirrel to avoid all such things.

---

This invention relates generally to the protection of objects and things from squirrel, and other rodents', damage and to a squirrel repellent composition.

Squirrels do extensive damage to overhead telephone cables which traverse areas, urban or rural, populated by squirrels. Overhead telephone cables carried on poles through wooded areas have a special attraction for squirrels, and it is apparently a great pleasure to squirrels to be able to gnaw upon the lead or plastic sheath which protects the host of small wires within a cable from damage by the elements. They chew their way through a lead sheath in no time at all, apparently for no nutritional or provenderal purpose. Accordingly, it is imperative for concerns operating cable lines in squirrel country to constantly inspect such lines, and repair the squirrel damage.

Of course, squirrels can be trapped; they can be shot; and they can be poisoned; as indeed some persons hold they should be. The persons in the last-named category are, however, seemingly not only outnumbered, but out-influenced and out-noised, by a well-organized group whose principal objective is to cause trouble for anyone who undertakes to protect his premises or his property from the ravages of squirrels, or other animals, if such protection involves doing bodily harm to the latter.

Accordingly, it is the object of the invention to provide a method and composition for protecting property from squirrel damage without inflicting physiological injury to the squirrel, or holding the squirrel captive in a manner such that he cannot free himself.

The invention is predicated upon the discovery that squirrels learn from brief experience to avoid substances which stick to their paws, muzzle, hair and other tissue; and they learn this lesson without being subjected to restraint of such degree that they cannot free themselves from it. Accordingly, objects can be protected against squirrel damage by being coated with a tacky substance. The tack of the substance need not be, and in the interest of being kind to animals, preferably is not, of such magnitude as to hold the squirrel permanently captive. The invention contemplates that the cohesiveness of the tacky substance be less than its adhesiveness toward squirrel tissues so that after the squirrel has broken its fetter, it has enough unpleasant grooming work to do on itself that the squirrel develops an instinctive phychological wariness of everything which looks like where it got stuck. Any tacky substance with the desired differential between cohesiveness and adhesiveness will work, at least temporarily, but since most such substances tend to harden and lose their tack upon exposure to the atmosphere, it is impractical, for the protection of telephone cables and the like, to use a substance which does not maintain its tack upon prolonged exposure to weather.

It is therefore preferable to use a tacky substance which maintains its desired differential between cohesiveness and adhesiveness for long periods of time such as a year or more, even on objects which are continually exposed to the weather. A great variety of resinous materials lend themselves to being blended together to produce compositions having the desired physical properties, including the differential between cohesiveness and adhesiveness toward squirrel tissue, longevity, resistance to weather, ease of application, and lack of tendency to creep on or from the object to which they are applied. Among such resinous materials, excellent results have been achieved with blends commerically available, completely and incompletely polymerized, alkenes, with or without fibrous or granular filler.

For the protection of overhead telephone cables from the ravages of squirrels, there is applied to the top surface of the lead or plastic-covered cable, or to its messenger, a ridge or bead of the tacky substance. The application need not extend for the entire length of the cable, but it is sufficient to apply it adjacent the squirrel access areas. By "squirrel access area" is meant a reasonable squirrel-jumping distance from poles, trees, or other bodies adjacent the overhead cable, as, for example, a radius of at least six feet horizontally from the nearest jumping-off place.

The following examples of compositions are illustrative of the preferred formulations:

TABLE I

| Example | Composition (parts by weight) | | | |
|---|---|---|---|---|
| | Polybutene (1,000) | Polybutene (3,000) | Polyethylene (particulate) | Asbestos fiber (med.) |
| A | 47.5 | 47.5 | 5 | 0 |
| B | 90.0 | 90.0 | 16 | 4 |
| C | 47.5 | 47.5 | 5 | 1 |
| D | 90 | 0 | 10 | 0 |
| E | 0 | 90 | 10 | 0 |
| F | 95 | 95 | 5 | 0 |
| G | 93 | 93 | 5 | 2 |
| H | 46 | 46 | 8 | 0 |
| I | 45 | 45 | 10 | 0 |

The parenthetical "(1,000)" and "(3,000)" subjacent to the respective polybutenes connote viscosity grades available on the market, that is to say, that the "(1,000)" means that the Saybolt Universal viscosity is approximately 1,000 seconds at 210° F., and that the "(3,000)" means that the Saybolt Universal viscosity is approximately 3,000 seconds at 210° F. Other properties of the respective component polybutenes—which affect the desiderata of: (a) longevity of the composition; (b) "-hesiveness" less than that which exceeds the ability of a squirrel to break it; and (c) adhesiveness greater than cohesiveness—are here set forth:

| Polybutene | "1,000" | "3,000" |
|---|---|---|
| Average molecular weight | 920 | 1,290 |
| Viscosity, SUS, 100° F., ASTM D 2161 | 35,944 | 140,000 |
| Viscosity, SUS, 210° F., ASTM D 2161 | 985 | 3,000 |
| Viscosity index, ASTM D 567 | 109 | 117 |
| Pour point, ° F., ASTM D 97 | +20 | +35 |
| Density, lb./gal. | 7.41 | 7.48 |
| Evaporation loss (10 hrs. at 210° F.) weight percent, ASTM D 972 | 0.0 | 1.0 |
| Acidity, mg. KOH/gm., ASTM D 974 | 0.01 | 0.01 |

The several alkenes are heated to an extent sufficient to melt the particulate polyethylene, and thoroughly mixed while so heated. During the mixing, the asbestos fiber, which is of "Medium Length" (i.e., chopped to a length of ¼ to ½ inch) is incorporated with substantial uniformity throughout the plastic mass. In order to maintain the maximum tack of the resulting composition, it is preferable to utilize a mixer which subjects the mass to the minimum of shear. Upon completion of the mixing, the mass is charged into appropriate containers from which it may be dipped (for application with a paddle or putty knife), or extruded as from a common caulking gun.

The composition is preferably applied as a bead or ridge about a quarter inch deep along the top increments (i.e., the squirrel walkway) of the cable messenger, or, where there is no messenger, along the top increments of the cable itself. Such a bead is so laid for a distance of six to ten feet, in each direction, from each pole, tree, or other squirrel access point.

Besides testing in actual use, the compositions of the foregoing examples have been subjected to one or both of two types of tests, to wit: "Tack Tests," and "Weatherometer Tests."

The "Tack Tests" were made by packing a two-inch diameter cup with the composition to be tested; then pressing a one-inch diameter circular flat metal disc, (having an upstanding anchorage) into firm surface contact (without embedding) with the composition in the cup, but free of the cup; and then pulling the disc away from the composition by means of an Instron universal tester. For each composition, five Tack Tests were made each at different cross-bar speeds of 0.05, 0.10, 0.50, 1.0, and 5.0 centimeters per minute, respectively, and the Maximum Tack force progressively increased (from the lower value stated in the following Table II to the higher value stated) as the cross-bar speed increased. From these tests: the force to release the disc in the direction perpendicular to its surface ("Maximum Tack Force") was recorded in grams; and the distance for which the disc moved relative to the cup before the connecting strand of composition stretched to the breaking point ("Stretch to Strand Break") was recorded in millimeters; all as shown in Table II below.

The "Weatherometer Tests" were made in a conventional accelerated weathering test device in which exposure for a period of one hundred hours is considered the equivalent of one year exposure to actual weather conditions, and each additional period of fifty hours is considered the equivalent of an additional year's exposure to actual weather. The weathering of the several compositions was appraised on the basis of weight lost during the period for which the tests continued. In each case, the test was made on a bead of the composition extruded from a caulking gun whose nozzle had a minimum diameter of a quarter inch. In the cases of Examples A, D, E, H, and I, total weight of the bead at the beginning of the tests was approximately 15 grams; while in the case of Examples B and C, it was approximately 5 grams. The "Weight Loss" and "Time in Test" are recorded in Table II.

In Table II, Examples B' and C' are the same composition as Examples B and C, respectively, but the primes were made in a larger batch and with an apparatus which subjected the components to greater shear during mixing than in the case of B and C. Since the polybutenes are somewhat shear sensitive, they lose viscosity, and hence cohesiveness, as the degree of shear to which they are subjected increases, as illustrated by the reduction in Maximum Tack Force and increase in Stretch from B to B' and from C to C'. While the presence or absence of the filler does not appear, per se, to affect either the Maximum Tack Force or the Stretch (note contrasting results between A (without asbestos) and C (with asbestos) as against F (without asbestos) and G (with asbestos)), the presence of asbestos does reduce the tendency of the composition to creep, slump or lose thickness after application as a bead or ridge along the uppermost crest of the cable or messenger, and hence prolongs the effectiveness of the application.

Example B exhibits the highest "Maximum Tack Force" among the several examples, but even that is less than the pulling force exertable by a squirrel which is big enough to be out of the nest—a feat which requires it to be at least capable of pulling its own weight—and it would be contrary to nature for an infant squirrel to reach a telephone cable while still in the nest. Assuming that an infant squirrel, to leave its nest, must weight at least four ounces; and assuming further that it is so undernourished that it can barely pull its own weight: it is evident that it at least has a pulling power of 113.4 grams (4 oz.) which is sufficient to break its fetter with the composition of Example B, unless it goes about its work so impatiently that it never tires of trying to pull itself loose at a rate much less than five centimeters per minute. But squirrels, like other animal life, do tire, and as they tire, they go about their work more patiently, with the result that the desired freedom is earned at pulling speed of less than five centimeters per minute, e.g., at one centimeter per minute where the maximum pull required is 56.2 grams.

From the foregoing description, those skilled in the art will readily understand that the invention accomplishes its objects, and provides an effective and enduring method of repelling squirrels from telephone cables, and the like, without inflicting physiological injury to the squirrel, and without holding it permanently captive, but, at the same time, instilling in the squirrel a psychological antipathy for the likes of things with which it had previous unpleasant experience. Moreover, while no test has yet been devised to prove it conclusively on wild squirrels, there is some indication that news travels within squirrel colonies, so that all individuals do not have to learn the lesson from personal unpleasantness.

Having thus described the invention, what is claimed and desired to be secured by Letters Patent is:

1. A telephone cable or the like adapted to be a squirrel walkway having applied thereto a ridge of weather-resistant tacky squirrel repellent whose adhesive tack exceeds its cohesive tack, said repellent comprising, a mixture of polyethylene and incompletely polymerized polybutenes in the proportions of about:

| | Parts by weight |
|---|---|
| Polyethylene | 5 to 10 |
| Polybutenes | 90 to 190 | said polybutenes being in substantially equal parts of one having a Saybolt Universal viscosity at 210° F. of approximately 1,000 seconds and one having a Saybolt Universal viscosity of 210° F. of approximately 3,000 seconds.

2. The article of claim 1 wherein said repellent has a cohesive tack of less than 113.4 grams at a stretch speed

TABLE II

| | Tack tests | | | | | Weatherometer tests | | |
|---|---|---|---|---|---|---|---|---|
| | Maximum tack force, g. | | | | | Average stretch to strand break, mm. | Weight loss, g. | Time in test, hours |
| Ex. | 0.05 | 0.10 | 0.50 | 1.0 | 5.0 | | | |
| A | 9.4 | 9.0 | 14.5 | 18.4 | 63.4 | 67.1 | 1.10 | 340 |
| B | 37.0 | 33.5 | 40.3 | 56.2 | 153.8 | 38.1 | 0.2 | 600 |
| B' | 29.2 | 22.1 | 37.7 | 39.4 | 100.0 | 58.4 | | |
| C | 12.5 | 10.4 | 15.4 | 20.3 | 66.2 | 58.4 | 0.7 | 600 |
| C' | 3.2 | 3.7 | 5.5 | 11.3 | 36.0 | 62.0 | | |
| D | | | | | | | 0.3 | 330 |
| E | | | | | | | 0.5 | 330 |
| F | 2.6 | 2.7 | 4.4 | 7.4 | 26.3 | 98.6 | | |
| G | 2.0 | 2.1 | 3.8 | 6.8 | 25.4 | 38.1 | | |
| H | | | | | | | 1.0 | 294 |
| I | | | | | | | 0.8 | 294 | of one centimeter per minute, and whose average strand elongation to failure is at least 38 millimeters.

References Cited
UNITED STATES PATENTS

| | | | |
|---|---|---|---|
| 2,054,448 | 9/1936 | Russell | 117—122P |
| 2,349,709 | 5/1944 | Evans | 117—122P |
| 2,349,710 | 5/1944 | Evans | 117—122P |
| 2,535,209 | 12/1950 | Hubert | 43—114 |
| 2,572,458 | 10/1951 | Eustis | 117—122PA |
| 2,656,297 | 10/1953 | Davis | 260—896 |
| 2,967,165 | 1/1961 | Bailey | 260—896 |
| 2,825,721 | 3/1958 | Hogan et al. | 117—122PA |
| 3,306,817 | 2/1967 | Reinert | 424—358 |

WILLIAM D. MARTIN, Primary Examiner

R. M. SPEER, Assistant Examiner

U.S. Cl. X.R.

117—122, 232; 424—83